United States Patent
Belov et al.

(10) Patent No.: US 11,621,893 B2
(45) Date of Patent: Apr. 4, 2023

(54) METHODS, SYSTEMS, AND COMPUTER READABLE MEDIA FOR ESTABLISHING DYNAMIC AGENT ASSOCIATIONS IN A CLOUD COMPUTING ENVIRONMENT

(71) Applicant: Keysight Technologies, Inc., Santa Rosa, CA (US)

(72) Inventors: Konstantin Belov, Thousand Oaks, CA (US); Amritam Putatunda, West Hills, CA (US); Tudor Simionescu, Bucharest (RO); Angela Nicoleta Grigoroaia, Bucharest (RO); Rudrarup Naskar, Kolkota (IN); Partha Majumdar, West Hills, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/173,152

(22) Filed: Feb. 10, 2021

(65) Prior Publication Data
US 2022/0255808 A1  Aug. 11, 2022

(30) Foreign Application Priority Data
Feb. 9, 2021  (RO) ............... a 2021 00040

(51) Int. Cl.
*H04L 41/147* (2022.01)
*H04L 43/0817* (2022.01)
(Continued)

(52) U.S. Cl.
CPC ........ *H04L 41/147* (2013.01); *H04L 41/0816* (2013.01); *H04L 43/0817* (2013.01); *H04L 43/50* (2013.01)

(58) Field of Classification Search
CPC ... H04L 41/147; H04L 43/0817; H04L 43/50; H04L 41/0816
See application file for complete search history.

(56) References Cited

U.S. PATENT DOCUMENTS 7,165,189 B1  1/2007  Lakkapragada et al.
8,677,183 B2  3/2014  Gorman et al.
(Continued)

OTHER PUBLICATIONS

Notice of Allowance for U.S. Appl. No. 15/783,715 (dated Mar. 18, 2020).
(Continued)

*Primary Examiner* — Philip C Lee

(57) ABSTRACT

One method occurs at a test system controller of a network test system implemented using at least one processor. The method includes establishing agent association criteria for a test system traffic generation agent to be deployed in a cloud computing system under test (SUT) and receiving a registration message from the test system traffic generation agent in response to a launching of the test system traffic generation agent in the cloud computing SUT. The method further includes obtaining agent property values associated with the one test system traffic generation agent from the registration message and sending test configuration data to the test system traffic generation agent in response to determining a match between the agent property values and the agent association criteria, wherein the test configuration data configures the test system traffic generation agent to operate as a predefined network segment in the cloud computing SUT.

20 Claims, 3 Drawing Sheets

(51) Int. Cl.
    *H04L 43/50*       (2022.01)
    *H04L 41/0816*     (2022.01)

(56) References Cited

U.S. PATENT DOCUMENTS

| | | | |
|---|---|---|---|
| 9,110,703 | B2 | 8/2015 | Santos et al. |
| 9,680,728 | B2 | 6/2017 | Besser |
| 10,205,648 | B1 | 2/2019 | Guo et al. |
| 10,362,048 | B2 | 7/2019 | Alexander et al. |
| 10,489,807 | B1 | 11/2019 | Arguelles |
| 10,515,000 | B2 * | 12/2019 | Moretto ............... G06F 11/3664 |
| 10,671,520 | B1 * | 6/2020 | Rodrigues ............ H04L 41/046 |
| 10,728,135 | B2 | 7/2020 | Raney |
| 11,070,289 | B1 * | 7/2021 | Hanson ............... H04B 10/079 |
| 2006/0048133 | A1 | 3/2006 | Patzachke et al. |
| 2008/0192624 | A1 | 8/2008 | De Frias |
| 2010/0094981 | A1 * | 4/2010 | Cordray ............... H04L 41/082 709/222 |
| 2011/0004698 | A1 | 1/2011 | Wu |
| 2011/0044291 | A1 | 2/2011 | Omar |
| 2013/0031233 | A1 | 1/2013 | Feng et al. |
| 2013/0205376 | A1 | 8/2013 | Narasimha et al. |
| 2013/0291109 | A1 | 10/2013 | Staniford et al. |
| 2014/0229605 | A1 | 8/2014 | Besser |
| 2015/0067404 | A1 | 3/2015 | Eilam et al. |
| 2015/0113132 | A1 * | 4/2015 | Srinivas ............. H04L 41/0823 709/224 |
| 2015/0263889 | A1 | 9/2015 | Newton |
| 2015/0319030 | A1 | 11/2015 | Nachum |
| 2016/0087859 | A1 | 3/2016 | Kuan et al. |
| 2016/0094418 | A1 | 3/2016 | Raney |
| 2016/0110211 | A1 | 4/2016 | Karnes |
| 2016/0248655 | A1 | 8/2016 | Francisco et al. |
| 2016/0277249 | A1 * | 9/2016 | Singh ................... H04L 41/50 |
| 2016/0285685 | A1 | 9/2016 | Zhou et al. |
| 2017/0093648 | A1 | 3/2017 | Elarabawy et al. |
| 2017/0099195 | A1 | 4/2017 | Raney |
| 2017/0118102 | A1 | 4/2017 | Majumder et al. |
| 2017/0163510 | A1 | 6/2017 | Arora et al. |
| 2017/0237633 | A1 | 8/2017 | Hegde et al. |
| 2017/0318053 | A1 | 11/2017 | Singh et al. |
| 2017/0374103 | A1 | 12/2017 | Testu |
| 2018/0091387 | A1 | 3/2018 | Levi et al. |
| 2019/0116110 | A1 * | 4/2019 | Raney ................... H04L 43/50 |

OTHER PUBLICATIONS

Final Office Action for U.S. Appl. No. 15/783,715 (dated Jan. 6, 2020).

Non-Final Office Action for U.S. Appl. No. 15/783,715 (dated Jul. 8, 2019).

Boeckman, Kelly, Docker containers vs. virtual machines: What's the difference? NetApp, Blog, 9 pgs. (accessed Jun. 16, 2017).

Bigelow, Stephen J., How do I find a VM host computer in a Microsoft or VMware environment?, 6 pgs. (accessed Jun. 12, 2017).

Kubernetes: Advanced Scheduling in Kubernetes, http://blog.kubernetes.io/2017/03/advanced-scheduling-in-kubernetes.html, 4 pgs. (May 22, 2017).

Shabeera, T.P. et al., "Optimizing VM allocation and data placement for data-intensive applications in cloud using ACO metaheuristic algorithm", Engineering Science and Technology, an International Journal, vol. 20, Issue 2, pp. 616-628 (Apr. 2017).

Redhat, Chapter 1. Get Started Orchestrating Containers with Kubernetes, 7 pgs. (accessed Jun. 7, 2017).

What's the Difference Between Containers and Virtual Machines?, http://www.electronicdesign.com/dev-tools/what-s-difference-between-containers-and-virtual-machines, 13 pgs., (accessed Jun. 16, 2017).

Ixia, Ixia xFilter, Data Sheet, 5 pgs. (May 2015).

Ixia, Ixia Phantom vTap with TapFlow Filter, Data Sheet, 4 pgs. (Jul. 2015).

Ixia, Ixia Flex Tap, Data Sheet, 5 pgs. (Oct. 2015).

Hofstede et al., "Flow Monitoring Explained: From Packet Capture to Data Analysis with NetFlow and IPFIX", IEEE, 31 pgs. (May 2014).

Wikipedia, "Kubernetes", Jul. 2017, 6 pgs.

Spirent White Paper, "NFV Validation Across Boundaries", 2015, 9 pgs.

"Cloud Agent—Getting Started Guide," Qualys, pp. 1-33 (Oct. 12, 2020).

"Keysight Cyperf—Distributed, Elastic Network Performance and Security Validation," pp. 1-10 (Sep. 4, 2020).

* cited by examiner

METHODS, SYSTEMS, AND COMPUTER READABLE MEDIA FOR ESTABLISHING DYNAMIC AGENT ASSOCIATIONS IN A CLOUD COMPUTING ENVIRONMENT

PRIORITY CLAIM

This application claims the priority benefit of Romanian Patent Application Serial Number a 2021 10005, filed Feb. 9, 2021, the disclosure of which is incorporated herein by reference in its entirety.

TECHNICAL FIELD

The subject matter described herein relates to cloud computing network testing. More specifically, the subject matter relates to methods, systems, and computer readable media for establishing dynamic agent associations in a cloud computing environment.

BACKGROUND

In many application and security testing scenarios, the presence of traffic endpoints operating within a traffic emulation test is largely unchanging. This network testing practice provides a reliable working model for computing system platforms where the resource allocations are similarly static in nature. With the ever-growing use of cloud computing and cluster technologies, the use of a static testing model is rapidly becoming obsolete. Notably, the network components that are a part of an elastic cloud computing service environment need to be able to function with dynamic hosts that are triggered to pop-up or terminate depending on the load that is present on the cloud computing infrastructure system. In order to test such an dynamic infrastructure, the traffic generating hosts utilized in the system need to be emulated by test agents. However, difficulties can arise attempting to manage and coordinate the dynamic test elements utilized by a cloud computing platform.

Accordingly, a need exists for methods, systems, and computer readable media for establishing dynamic agent associations in a cloud computing environment.

SUMMARY

Methods, systems, and computer readable media for establishing dynamic agent associations in a cloud computing environment are disclosed. According to one method, the method occurs at a test controller of a network test system implemented using at least one processor. The method includes establishing agent association criteria for at least one test system traffic generation agents to be deployed in a cloud computing system under test (SUT) and receiving a registration message from the at least one test system traffic generation agent in response to a launching of the at least one test system traffic generation agent in the cloud computing SUT. The method further includes obtaining agent property values associated with the at least one test system traffic generation agent from the registration message and sending test configuration data to the at least one test system traffic generation agent in response to determining a match between the agent property values and the agent association criteria, wherein the test configuration data configures the at least one test system traffic generation agent to operate as a predefined network segment in the cloud computing SUT.

According to another aspect of the subject matter described herein, the method includes at least one test system traffic generation agent that generates packet traffic in the cloud computing SUT in accordance with the test configuration data and subsequently communicates traffic metric data to a test system controller.

According to another aspect of the subject matter described herein, the cloud computing SUT is an cloud computing auto-scale-group or an elastic cloud computing server farm.

According to another aspect of the subject matter described herein, the at least one test system traffic generation agent is a dynamic server host, a dynamic client node, or a traffic generation endpoint.

According to another aspect of the subject matter described herein, the agent property values include an Internet protocol (IP) subnet, a cluster or cloud computing infrastructure identifier, a geographical location, a cloud computing platform-specific tag, or resource availability data associated with the at least one test system traffic generation agent.

According to another aspect of the subject matter described herein, the at least one test system traffic generation agent is launched in the cloud computing SUT before or during an active test session.

According to another aspect of the subject matter described herein, the at least one test system traffic generation agent operating as the predefined network segment is configured to generate application packet traffic or attack packet traffic.

According to one system, the system includes a test system controller of a network test system implemented using at least one processor. The test system controller is configured for: establishing agent association criteria for at least one test system traffic generation agents to be deployed in a cloud computing SUT and receiving a registration message from the at least one test system traffic generation agent in response to a launching of the at least one test system traffic generation agent in the cloud computing SUT. The test system controller further includes obtaining agent property values associated with the at least one test system traffic generation agent from the registration message and sending test configuration data to the at least one test system traffic generation agent in response to determining a match between the agent property values and the agent association criteria, wherein the test configuration data configures the at least one test system traffic generation agent to operate as a predefined network segment in the cloud computing SUT.

According to another aspect of the subject matter described herein, the system includes at least one test system traffic generation agent that generates packet traffic in the cloud computing SUT in accordance with the test configuration data and subsequently communicates traffic metric data to a test system controller.

According to another aspect of the subject matter described herein, the cloud computing SUT is an cloud computing auto-scale-group or an elastic cloud computing server farm.

According to another aspect of the subject matter described herein, the at least one test system traffic generation agent is a dynamic server host, a dynamic client node, or a traffic generation endpoint.

According to another aspect of the subject matter described herein, the agent property values include an Internet protocol (IP) subnet, a cluster or cloud computing infrastructure identifier, a geographical location, a cloud computing platform-specific tag, or resource availability data associated with the at least one test system traffic generation agent.

According to another aspect of the subject matter described herein, the at least one test system traffic generation agent is launched in the cloud computing SUT before or during an active test session.

According to another aspect of the subject matter described herein, the at least one test system traffic generation agent operating as the predefined network segment is configured to generate application packet traffic or attack packet traffic.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
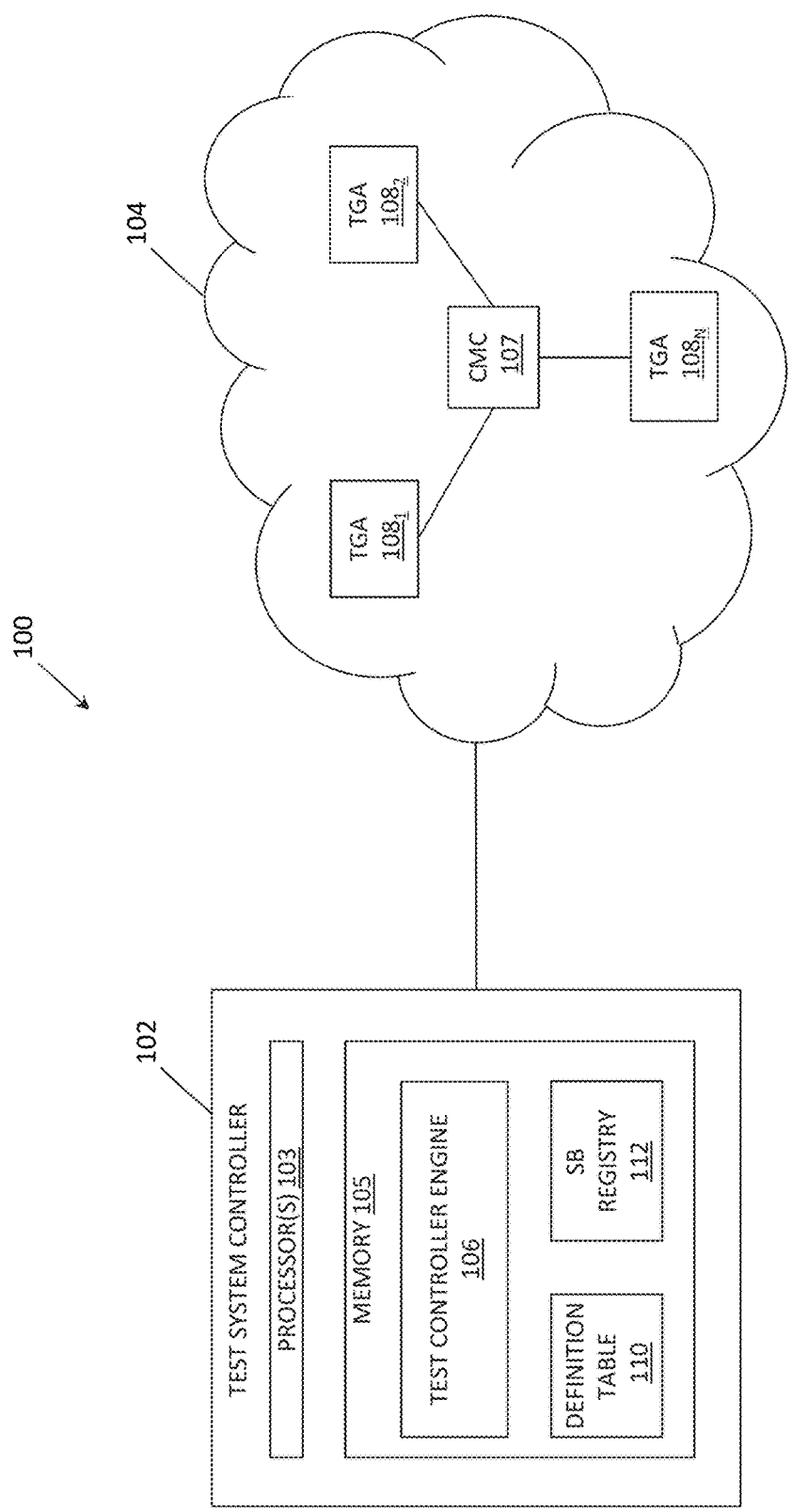
FIG. 1 is a diagram illustrating an example network test system for cloud computing environment testing.

The subject matter described herein includes methods, systems, and computer readable media for establishing dynamic agent associations in a cloud computing environment. Such cloud computing infrastructure testing can be useful for determining how test system traffic generation agents can impact a dynamically changing cloud computing environment. In some embodiments, a network test system can include test system agent (e.g., a CyPerf agent) that can be provisioned in a cloud management controller (CMC) and/or server. Notably, the CMC can be used in conjunction with a test system controller to deploy and emulate dynamic server hosts in a cloud computing infrastructure, e.g., an elastic cloud server farm or a cloud computing auto-scale-group, such as Amazon Web services (AWS). In addition to AWS, the cloud computing testing system described herein can also utilize test system traffic generation agents for emulating dynamic pods in other architectures or clusters without departing from the scope of the disclosed subject matter. Notably, most known testing solutions are based on the notion that the traffic generating endpoints participating in the emulation network test are previously known in advance (i.e., prior to the active test session). In contrast, the test configuration model disclosed herein does not assume that all the traffic endpoints or test system agents are known prior to the active testing of the cloud computing infrastructure or platform.

As indicated in further detail below, the disclosed subject matter utilizes agent association criteria that can be defined in terms of agent property values or tags corresponding to the test system traffic generation agents that may be deployed in a cloud computing environment test. Since the traffic generation agents are not known in advance of a test session, these dynamic traffic generation agents/endpoints cannot be associated with a test or a network segment in a test via the use of a unique identifier (e.g., an IP address, chassis identifier, card identifier, port identifier, etc.). As such, the cloud computing infrastructure testing methodology associated with the disclosed subject matter is configured to define a unique agent association criteria for different test system traffic generation agents functioning as network segments or portions of enterprise applications in the cloud computing infrastructure.

For example, when random test system agents launch or are deployed in an elastic cloud computing environment, those agents are configured to attempt to register with the test system controller (e.g., send a registration message). Notably, the test system agent will publish all of its associated agent property values and include them in the registration message communicated to the test system controller. After the registration process is completed, the test controller subsequently inspect all of the agent association criteria defined for all of the network segments created for a test. The test system controller also may be configured to link these agents with the appropriate network segments. Some examples of the test system agent properties that can apply in different test configurations include: i) the IP subnets corresponding to the agent's interfaces, ii) the cloud or cluster the agent belongs to (e.g., AWS, Azure, ESXi, Google Cloud Platform, etc.), iii) the geographical location of the agent, iv) platform specific tags assigned to the agent (e.g., owner tag, logical grouping tag, etc.), v) resources available in the agent (e.g., number of CPU cores, amount of memory, AWS instance type, etc.).

FIG. 1 is a diagram illustrating an example network test system 100 for testing cloud computing environments. As shown in FIG. 1, network test system 100 includes a test system controller 102 and a cloud computing environment 104 (e.g., a cloud computing services infrastructure or platform) that serves as a system under test (SUT) when subjected to an active test session by test system controller 102. In some embodiments, test system controller 102 includes at least one processor 103 and memory 105. For example, processor(s) 103 may include hardware based processor, such as a central processing unit (e.g., a single core or multiple processing cores), a microprocessor, a microcontroller, a network processor, an application-specific integrated circuit (ASIC), or the like. Likewise, memory 105 may comprise random access memory (RAM), flash memory, a magnetic disk storage drive, and the like. In some embodiments, memory 105 may be configured to store a test controller engine 106, a definition table 110, and a network segment binding registry 112. In some embodiments, test controller engine 106 includes a software component or algorithm that, when executed by processor 103, is configured to conduct a test session of cloud computing environment 104. Segment binding registry 112 may include a database that contains entries of dynamic test system agents and their corresponding networks segment assignments. Similarly, definition table 110 may include a database that contains entries of network segments and corresponding agent association criteria (AAC). Although FIG. 1 depicts cloud computing environment 104 as an off-premises cloud computing services platform, on-premises deployments and/or systems can also be implemented in accordance with the disclosed subject matter. For example, cloud computing environment 104 can include any cluster infrastructure (e.g., Kubernetes (k8s) clusters) and/or a lab or data-center deployment. In addition, cloud computing environment 104 can include managed services platform, such as Kubernetes Certified Services (KCS).

As shown in FIG. 1, cloud computing environment 104 includes a plurality of test system traffic generation agents $108_1 \ldots _N$. Although three traffic generation agents are depicted in FIG. 1, any number of traffic generation agents may be provisioned in cloud computing environment 104 without departing from the scope of the disclosed subject matter. Cloud computing environment 104 further includes a cloud management controller (CMC) 107 that is communicatively connected to test system traffic generation agents $108_1 \ldots _N$. In some embodiments, cloud management controller 107 is provisioned with a test system management agent that is responsible for launching and/or deploying test system traffic generation agents during an active test session of cloud computing environment 104.

In some embodiments, cloud computing environment 104 includes an on-demand cloud computing services environment and associated application program interfaces (APIs) that enables individuals, companies, and other subscribing entities to access computing and web services hosted in the cloud. Notably, the cloud computing services hosted by cloud computing environment 104 can provide subscribers an abstract technical infrastructure that includes a variety of distributed computing building blocks and tools. For example, cloud computing environment 104 may provide user access to a virtual cluster of computers that are largely available all of the time via the Internet. The virtual computers hosted by cloud computing environment 104 emulates many attributes associated with a real computer, including hardware central processing units (CPUs) and graphics processing units (GPUs), local/RAM memory, hard-disk/SSD storage, any one of a plurality of operating systems; networking functionality; and pre-loaded application software such as web servers, databases, and customer relationship management (CRM).

Figure 2:
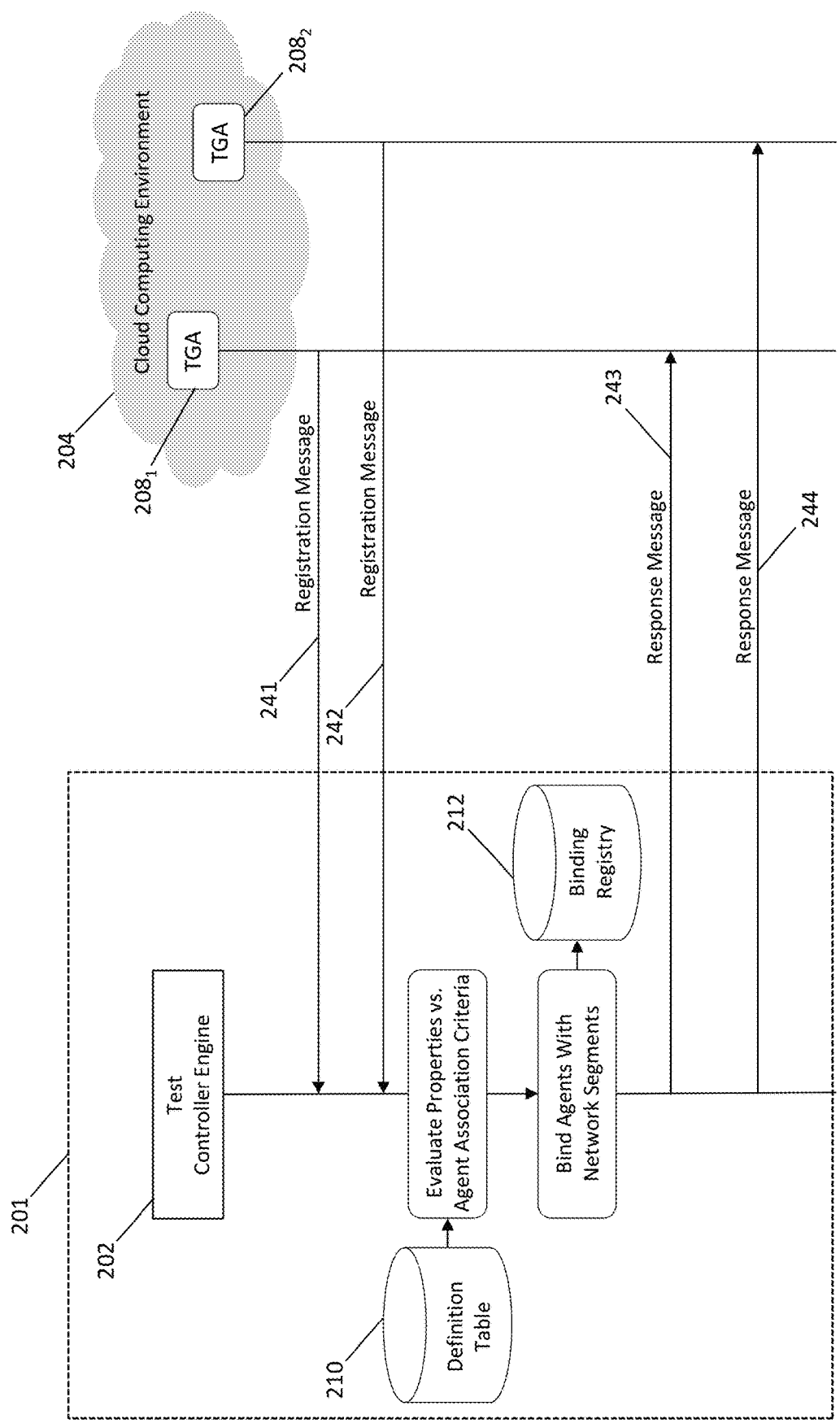
FIG. 2 is a diagram illustrating an example test system controller for establishing dynamic agent associations in a cloud computing environment.

FIG. 2 is a diagram illustrating an example test system controller for establishing dynamic agent associations in a cloud computing environment. In some embodiments, a test controller engine 202 (e.g., stored in memory of a test system controller 201) can be provisioned with agent association criteria. Notably, a network operator or customer subscriber that is utilizing cloud computing environment 204 may provision test controller engine 202 with agent association criteria that defines and effectively controls the manner a test system traffic agent instance is deployed in an active test session. In some embodiments, agent association criteria includes test system agent property values that correspond with various network segments or portions of enterprise applications that need to be provided and/or tested in cloud computing environment 204. For example, the test system agent property values that can apply in different test configurations include, but are not limited to, i) Internet protocol (IP) subnets that are utilized by interfaces of the test system traffic generation agent, ii) the cloud or cluster the traffic generation agent is subscribed to (e.g., AWS, Azure, ESXi, Google Cloud Platform, etc.), iii) the geographical location of the test system traffic generation agent, iv) platform specific tags assigned to the test system traffic generation agent (e.g., owner tag, logical grouping tag, etc.), v) the resources available in the test system traffic generation agent (e.g., number of processing cores, amount of memory, cloud instance type, etc.), and the like. Although FIG. 2 depicts cloud computing environment 204 as an off-premises cloud computing services platform, on-premises deployments and/or systems can also be implemented in accordance with the disclosed subject matter. For example, cloud computing environment 204 can include any cluster infrastructure (e.g., Kubernetes (k8s) clusters) and/or a lab or data-center deployment. In addition, cloud computing environment 204 can include managed services platform, such as Kubernetes Certified Services (KCS).

Specifically, the test system agent property values that define the agent association criteria are stored as data entries in a network segment association criteria definition table 210. In some embodiments, definition table 210 can be a database locally stored in and/or accessible by test controller engine 202. Notably, each entry of definition table 210 includes one or more test system agent property values that are mapped to a particular network segment (or enterprise application portion) that can be supported in cloud computing environment 204. For example, definition table 210 may include a data entry that specifies that a test system traffic generation agent that is located in Germany will be tasked to function as a social media network segment (or enterprise application) server in cloud computing environment 204.

In some embodiments, a customer subscriber and/or network operator may be permitted to define a minimum number and/or a maximum number of test system traffic generation agents that can be associated with a network segment prior to the initiation/execution of any test session of a cloud computing environment or platform. In particular, the customer can provision test controller engine 202 with data defining the minimum and maximum number limits of the traffic generation agents.

After definition table 210 in test controller engine 202 is provisioned with all of the agent association criteria, cloud computing environment 204 (i.e., operating as a SUT) may be subjected to an active test session by test controller engine 202. For example, during the active test session, test system traffic generation agents $208_1$ and $208_2$ may be launched by cloud computing environment 204 (e.g., by a cloud management controller). Notably, the test system traffic generation agents can be deployed or launched during an active test session in a number of ways. For example, the CMC in the cloud computing environment can create instances of the test system traffic generation agents using asterisk management interfaces (AMIs). Likewise, the CMC can generate virtual machine instances using Open Virtual Appliance (OVA) files. Further, CMC can deploy test system traffic generation agents in a Ubuntu instance using .deb installation files. In some embodiments, the elastic cloud computing infrastructure can be subjected to an auto-scale-group testing environment where new test system traffic generation agents (e.g., AWS instances) are created based on scaling parameters that are set by the customer subscribers or network operators of the cloud computing platform. Notably, the test system controller does not directly control the generation of the traffic generation agents or instances in the cloud computing environment, but instead functions in cooperation with the CMC to launch the traffic generation agents. In some embodiments, test system controller may be configured to support container based agent deployments, which enable the test system traffic generation agents to participate in similar elastic environments of Kubernetes (k8s) clusters.

Upon being deployed and/or created, test system traffic generation agents 206-208 are configured to determine the network address and/or identity of test system controller 201. In some embodiments, each of the test system traffic generation agents $208_1$ and $208_2$ may be configured to use logic to read identification information corresponding to test system controller 201 from a local file or a cloud-based script.

Once the identification information or network address information pertaining to test system controller 201 is determined, each of the test system traffic generation agents 206-208 may be configured to generate a registration message that includes and/or publishes the agent property value data or tags (associated with that respective traffic generation agent). In particular, each of the test system traffic generation agents $208_1$ and $208_2$ sends their respective registration message (e.g., messages 241-242) containing the relevant agent property value data to test system controller 201.

After receiving the registration messages 241-242, test system controller 201 and/or test controller engine 202 may be configured to obtain and/or extract the agent property value data from the registration messages. For example, as shown in block 214 in FIG. 2, test controller engine 202 is further configured to analyze the extracted agent property value data. For example, test controller engine 202 may compare the agent property value data corresponding to test system traffic generation agent $208_1$ with the definition entries (i.e., agent association criteria) in definition table 210. In particular, test controller engine 202 may access definition table 210 and determine if a match between the agent property value data and any of the stored agent association criteria exists. If test controller engine 202 finds a matching entry (e.g., matching agent property values), then test controller engine 202 identifies the network segment (or an application portion) that is also mapped to the entry that contains the matching agent association criteria. This process is repeated for each registration message received from the test system traffic generation agents (e.g., test system traffic generation agent $208_2$) in cloud computing environment 204.

After establishing the links or bindings existing between the identified network segments (or portions of enterprise applications) and test system traffic generation agents $208_1$ and $208_2$, test controller engine 202 records the binding information in a "test system agent-network segment" binding registry 212. As indicated above, binding registry 212 may be a database including data entries that maps deployed test system traffic generation agents with network segments of cloud computing environment 204. After recording/storing the bindings (i.e., links or network segment task assignments), test system controller 201 and/or test controller engine 202 may be configured to send test configuration data to the test system traffic generation agents $208_1$ and $208_2$ via response messages 243-244 In some embodiments, the test configuration data includes information that configures a test system traffic generation agent to function as the assigned network segment in the cloud computing infrastructure.

In response to receiving the traffic generation configuration instructions, the new test system traffic generation agent is configured to execute the configuration instructions and subsequently begins to generate the assigned network test packet traffic. In some embodiments, the test traffic may be benign application packet traffic, attack packet traffic, or both. After a predetermined time period, the test system traffic generation agent (as well as other traffic generation agents in the elastic computing cloud environment that are involved in the test session) is configured to communicate the test results and/or metric data back to test system controller 201 and/or test controller engine 202. In response, test controller engine 202 processes the test session result data. For example, the test controller engine 202 can aggregate the test results information from all of the traffic generation agents involved in the session test. Further, the test controller engine 202 may generate one or more test results reports for the customer.

In one exemplary scenario, in response to being configured as a particular network segment, the test system traffic generation agent initiates the generating of packet traffic that is specific to the network segment as defined in the test configuration data. For example, the configuration data may task the test system traffic generation agent to produce social media packet traffic as if the agent were functioning as a social media network segment server. After generating the appropriate packet traffic as a social media network segment server, the test system controller can also be configured to acquire message result data from the participating test system traffic generation agents. Notably, test controller engine 202 may be configured to receive the metric data captured and sent by the sending test system traffic generation agents. Upon receiving the metric data, test controller engine 202 analyzes the information and generates the corresponding test result reports. In particular, the test result reports may be directed to a network operator or customer subscriber.

Figure 3:
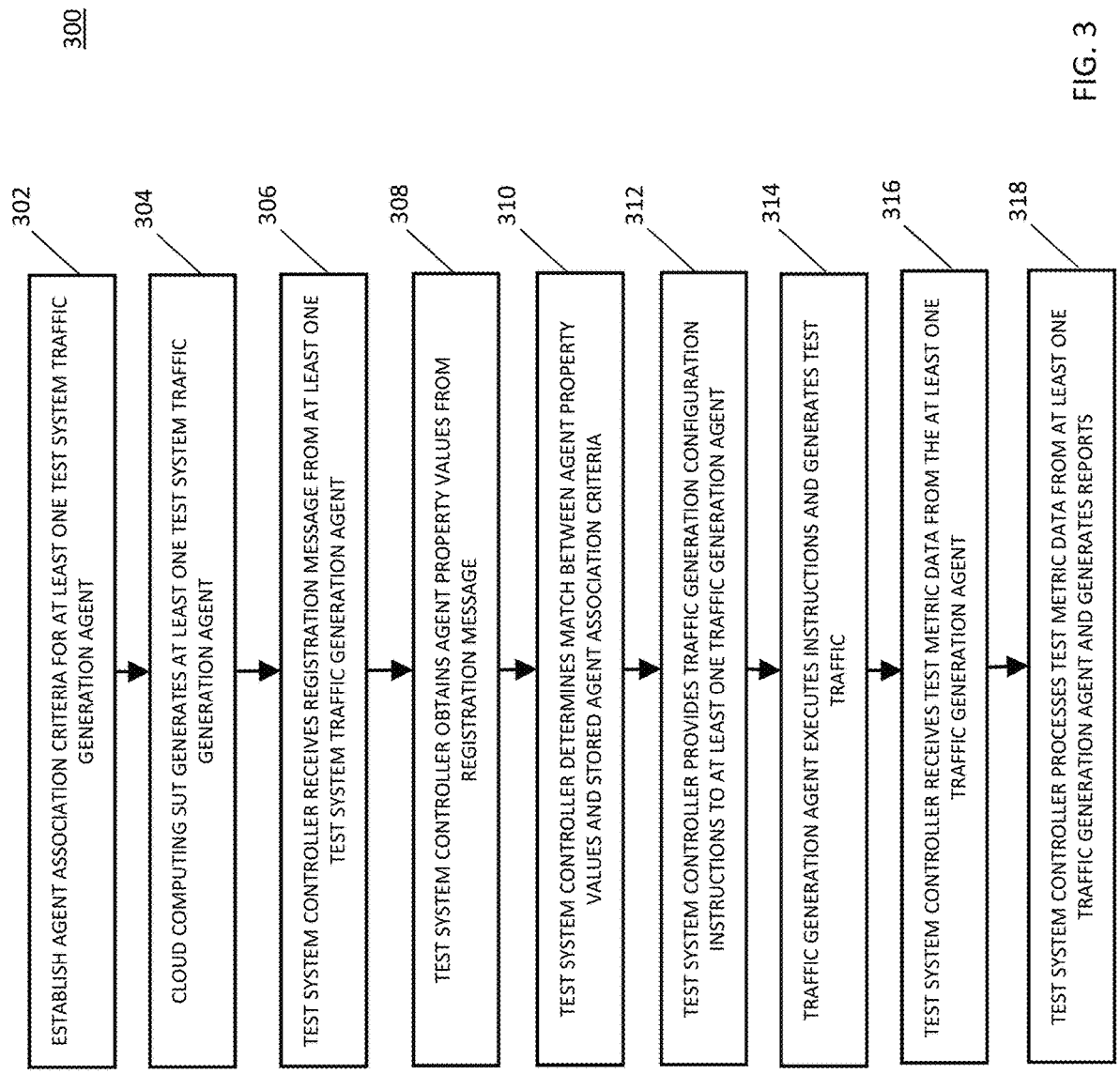
FIG. 3 is a diagram illustrating an example process for establishing dynamic agent associations in a cloud computing environment.

FIG. 3 is a diagram illustrating an example process 300 for establishing dynamic agent associations in a cloud computing environment. In some embodiments, process 300, or portions thereof, may be performed by or at test system controller 102/202, test controller engine 106/206, one or more of dynamic test system traffic generation agents 108/208, and/or another node). In some embodiments, process 300 may include steps 302-318.

Referring to process 300, in step 302, agent association criteria for at least one test system traffic generation agent is established. In some embodiments, a network operator or customer subscriber provisions the test system controller with agent association criteria. As indicated above, the agent association criteria is defined by one or more agent property values. Examples of agent property values that can apply in different test configurations include i) IP subnets the traffic generation agent's interfaces are utilizing, ii) the cloud or cluster the traffic generation agent is subscribed to (e.g., AWS, Azure, ESXi, Google Cloud Platform, etc.), iii) the geographical location of the traffic generation agent, iv) platform specific tags assigned to the traffic generation agent (e.g., owner tag, logical grouping tag, etc.), and v) the resources available in the traffic generation agent (e.g., number of processing cores, amount of memory, cloud instance type, etc.). In particular, the agent association criteria is stored in a definitions table that maps the criteria to a predefined network segment or application that is operated in the cloud computing infrastructure.

Since the traffic generation agents are not known in advance of a test session, these dynamic traffic generation agents/endpoints cannot be associated with a test or a network segment in a test via the use of a unique identifier (e.g., an IP address, chassis identifier, card identifier, port identifier, etc.). As such, the cloud computing infrastructure testing methodology associated with the disclosed subject matter is configured to define a unique agent association criteria for different test system traffic generation agents functioning as network segments or portions of applications in the cloud computing infrastructure.

In step 304, at least one test system traffic generation agent is generated. In some embodiments, the cloud computing infrastructure operates a SUT and is subjected to an active test session. During the active test session, the cloud computing infrastructure (e.g., the CMC) launches one or more test system traffic generation agents. Upon being launched or triggered, the test system traffic generation agent is configured to read a file or cloud-based script to determine the address or identifier for the test system controller that is responsible for conducting the active test session. Afterwards, the test system traffic generation agent generates a registration message that includes the agent property values or tags associated with that particular test system traffic generation agent. In some embodiments, a customer subscriber or network operator may be permitted to define a minimum number and/or a maximum number of test system traffic generation agents that can be associated with a network segment prior to the initiation/execution of any test session of a cloud computing platform. In particular, the customer can provision the test system controller with data indicating the minimum and maximum number limits of the traffic generation agents.

In step 306, the test system controller receives a registration message. In some embodiments, the test system controller receives a registration message containing agent property values from the sending test system traffic generation agent.

In step 308, the test system controller obtains test system agent property values from the registration message. Notably, in response to receiving the registration message from a test system traffic generation agent in step 306, the test system controller can extract the agent property values from the received message for further processing. For example, after receiving the registration messages from the plurality of test system traffic generation agents, the test system controller is configured to inspect all of the agent association criteria (and/or agent property values included in the registration messages) in the received registration messages. In particular, the test system controller is configured to establish a link between the agent property values of the test system traffic generation agent(s) with appropriate network segment(s) that have been created for the test session, wherein the link is based on the agent association criteria (as indicated below in step 310).

In step 310, the test system controller determines a match between the agent property values and the stored agent association criteria. In some embodiments, the test system controller utilizes the agent property values contained in the registration message to access the definition table. In particular, the test system controller attempts to identify a match between the received agent property values and the stored agent association criteria. In the event a match is found, the test system controller will obtain the network segment information that is further mapped to the entry containing the agent association criteria in the definition table.

In step 312, the test system controller provides traffic generation configuration instructions to the at least one test system traffic generation agent. In some embodiments, in response to finding a match in step 310, the test system controller generates a registration response message that includes test configuration instructions that will allow the test system traffic generation agent to function as the network segment identified by the test system controller in step 310. In some embodiments, the test system controller further records the binding or link existing between the network segment information and the test system traffic generation agent in a local binding registry. In particular, the configuration instructions provided to the test system traffic generation agent(s) are associated with the agent association criteria stored in the definition table. As such, the configuration instructions that are sent to the test system traffic generation agent(s) is directly related to, and provided in response to, the agent property values (which match the stored agent association criteria) originally received by the test system controller from the sending test system traffic generation agent(s).

In step 314, the test system traffic generation agent executes the traffic generation configuration instructions. In some embodiments, the test system traffic generation agent utilizes the configuration instructions to begin functioning as a network segment or application within the cloud computing infrastructure during the active test session. In particular, the test system traffic generation agent may initiate the generation of application packet traffic or attack packet traffic during the active test session.

In step 316, the test system controller receives test metric data from at least one traffic generation agent. In some embodiments, the test system traffic generation agent sends a status update message containing test metric data pertaining to the packet traffic generated by the test system traffic generation agent.

In step 318, the test system controller processes the test metric data from the at least one traffic generation agent. In some embodiments, the test system controller extracts the test metric data from the status update message. Notably, the test system controller subsequently utilizes the test metric data to generate reports for the network operator or customer subscriber.

In some embodiments, the at least one test system traffic generation agent generates packet traffic in the cloud computing SUT in accordance with the test configuration data and subsequently communicates traffic metric data to a test system controller.

In some embodiments, the cloud computing SUT is an cloud computing auto-scale-group or an elastic cloud computing server farm.

In some embodiments, the at least one test system traffic generation agent is a dynamic server host, a dynamic client node, or a traffic generation endpoint.

In some embodiments, the agent property values include an Internet protocol (IP) subnet, a cluster or cloud computing infrastructure identifier, a geographical location, a cloud computing platform-specific tag, or resource availability data associated with the at least one test system traffic generation agent.

In some embodiments, the at least one test system traffic generation agent is launched in the cloud computing SUT before or during an active test session.

In some embodiments, the at least one test system traffic generation agent operating as the predefined network segment is configured to generate application packet traffic or attack packet traffic.

It will be appreciated that process 300 is for illustrative purposes and that different and/or additional actions may be used. It will also be appreciated that various actions described herein may occur in a different order or sequence.

It should be noted that test system controller 102/202, test controller engine 106/206, test system traffic generation agents 108/208, and/or functionality described herein may constitute one or more special purpose computing devices. Further, test system controller 102/202, test controller engine 106/206, test system traffic generation agents 108/208, and/or functionality described herein can improve the technological field of testing cloud computing networks with changing topologies and related nodes by establishing associations between dynamic test system traffic generation agents and their assigned network segment tasks.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for establishing dynamic agent associations in a cloud computing environment, the method comprising:

at a test system controller of a network test system implemented using at least one processor:

establishing agent association criteria for at least one test system traffic generation agent to be deployed in a cloud computing system under test (SUT):

receiving a registration message from the at least one test system traffic generation agent in response to a launching of the at least one test system traffic generation agent in the cloud computing SUT during an active test session of the cloud computing SUT, wherein the launching of the at least one test system traffic generation agent includes creating a virtual instance of the at least one test system traffic generation agent during the active test session;

obtaining agent property values associated with the at least one test system traffic generation agent from the registration message; and sending test configuration data to the at least one test system traffic generation agent in response to determining a match between the agent property values and the agent association criteria, wherein the test configuration data configures the at least one test system traffic generation agent to operate as a predefined network segment in the cloud computing SUT.

2. The method of claim 1 wherein the at least one test system traffic generation agent generates packet traffic in the cloud computing SUT in accordance with the test configuration data and subsequently communicates traffic metric data to a test system controller.

3. The method of claim 1 wherein the cloud computing SUT is an cloud computing auto-scale-group or an elastic cloud computing server farm.

4. The method of claim 1 wherein the at least one test system traffic generation agent is a dynamic server host, a dynamic client node, or a traffic generation endpoint.

5. The method of claim 1 wherein the agent property values include an Internet protocol (IP) subnet, a cluster or cloud computing infrastructure identifier, a geographical location, a cloud computing platform-specific tag, or resource availability data associated with the at least one test system traffic generation agent.

6. The method of claim 1 wherein at least one first test system traffic generation agent is launched in the cloud computing SUT before the active test session.

7. The method of claim 1 wherein the at least one test system traffic generation agent operating as the predefined network segment is configured to generate application packet traffic or attack packet traffic.

8. A system for establishing dynamic agent associations in a cloud computing environment, the system comprising:

at least one processor;

a test system controller of a network test system implemented using the at least one processor, wherein the test system controller is configured for:

establishing agent association criteria for at least one test system traffic generation agent to be deployed in a cloud computing system under test (SUT):

receiving a registration message from the at least one test system traffic generation agent in response to a launching of the at least one test system traffic generation agent in the cloud computing SUT during an active test session of the cloud computing SUT, wherein the launching of the at least one test system traffic generation agent includes creating a virtual instance of the at least one test system traffic generation agent during the active test session;

obtaining agent property values associated with the at least one test system traffic generation agent from the registration message; and sending test configuration data to the at least one test system traffic generation agent in response to determining a match between the agent property values and the agent association criteria, wherein the test configuration data configures the at least one test system traffic generation agent to operate as a predefined network segment in the cloud computing SUT.

9. The system of claim 8 wherein the at least one test system traffic generation agent generates packet traffic in the cloud computing SUT in accordance with the test configuration data and subsequently communicates traffic metric data to a test system controller.

10. The system of claim 8 wherein the cloud computing SUT is an cloud computing auto-scale-group or an elastic cloud computing server farm.

11. The system of claim 8 wherein the at least one test system traffic generation agent is a dynamic server host, a dynamic client node, or a traffic generation endpoint.

12. The system of claim 8 wherein the agent property values include an Internet protocol (IP) subnet, a cluster or cloud computing infrastructure identifier, a geographical location, a cloud computing platform-specific tag, or resource availability data associated with the at least one test system traffic generation agent.

13. The system of claim 8 wherein at least one first test system traffic generation agent is launched in the cloud computing SUT before the active test session.

14. The system of claim 8 wherein the at least one test system traffic generation agent operating as the predefined network segment is configured to generate application packet traffic or attack packet traffic.

15. A non-transitory computer readable medium having stored thereon executable instructions embodied in the computer readable medium that when executed by at least one processor of a network test system cause the network test system to perform steps comprising:

at a test system controller of a network test system implemented using at least one processor:

establishing agent association criteria for at least one test system traffic generation agent to be deployed in a cloud computing system under test (SUT):

receiving a registration message from the at least one test system traffic generation agent in response to a launching of the at least one test system traffic generation agent in the cloud computing SUT during an active test session of the cloud computing SUT, wherein the launching of the at least one test system traffic generation agent includes creating a virtual instance of the at least one test system traffic generation agent during the active test session;

obtaining agent property values associated with the at least one test system traffic generation agent from the registration message; and sending test configuration data to the at least one test system traffic generation agent in response to determining a match between the agent property values and the agent association criteria, wherein the test configuration data configures the at least one test system traffic generation agent to operate as a predefined network segment in the cloud computing SUT.

16. The non-transitory computer readable medium of claim 15 wherein the at least one test system traffic generation agent generates packet traffic in the cloud computing SUT in accordance with the test configuration data and subsequently communicates traffic metric data to a test system controller.

17. The non-transitory computer readable medium of claim 15 wherein the cloud computing SUT is an cloud computing auto-scale-group or an elastic cloud computing server farm.

18. The non-transitory computer readable medium of claim 15 wherein the at least one test system traffic generation agent is a dynamic server host, a dynamic client node, or a traffic generation endpoint.

19. The non-transitory computer readable medium of claim 15 wherein the agent property values include an Internet protocol (IP) subnet, a cluster or cloud computing infrastructure identifier, a geographical location, a cloud computing platform-specific tag, or resource availability data associated with the at least one test system traffic generation agent.

20. The non-transitory computer readable medium of claim 15 wherein at least one first test system traffic generation agent is launched in the cloud computing SUT before the active test session.

* * * * *

UNITED STATES PATENT AND TRADEMARK OFFICE
CERTIFICATE OF CORRECTION

PATENT NO. : 11,621,893 B2
APPLICATION NO. : 17/173152
DATED : April 4, 2023
INVENTOR(S) : Konstantin Belov et al.

It is certified that error appears in the above-identified patent and that said Letters Patent is hereby corrected as shown below:

In the Specification

In Column 1, Line 9, delete "2021 10005," and insert -- 2021 00040, --.

In the Claims

In Column 11, Line 24, in Claim 1, delete "(SUT):" and insert -- (SUT); --.

In Column 12, Line 9, in Claim 8, delete "(SUT):" and insert -- (SUT); --.

In Column 12, Line 62, in Claim 15, delete "(SUT):" and insert -- (SUT); --.

Signed and Sealed this
Twelfth Day of September, 2023

Katherine Kelly Vidal
*Director of the United States Patent and Trademark Office*